S. SPOOR.
Boiling-Kettle.
No. 6,406. Reissued April 27, 1875.
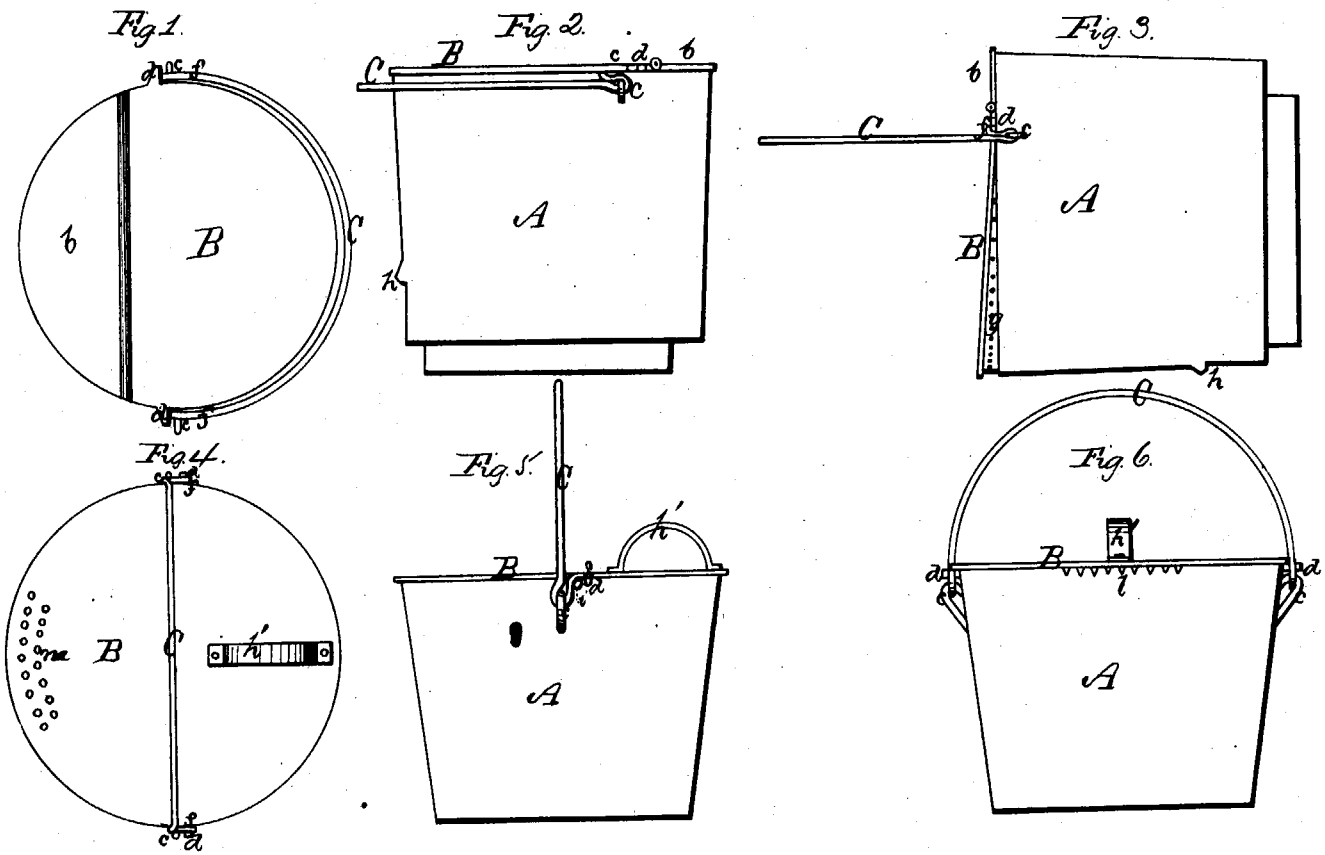
WITNESSES
C. M. Gallaher.
R. D. Smith
By
INVENTOR
Stephen Spoor,
J. S. Brown his Attorney
THE GRAPHIC CO. PHOTO-LITH. 39 & 41 PARK PLACE, N.Y.

UNITED STATES PATENT OFFICE.

STEPHEN SPOOR, OF TROY, NEW YORK.

IMPROVEMENT IN BOILING-KETTLES.

Specification forming part of Letters Patent No. 87,306, dated February 23, 1869; reissue No. 6,406, dated April 27, 1875; application filed September 10, 1874.

*To all whom it may concern:*

Be it known that I, STEPHEN SPOOR, of Troy, in the county of Rensselaer and State of New York, have invented an Improved Boiler or Kettle for Cooking Purposes; and I do hereby declare that the following is a full and exact description thereof, reference being had to the accompanying drawings making part of this specification—

Figure 1 being a top view of the boiler or kettle; Fig. 2, a side view thereof when in an upright position, as in use; Fig. 3, a side view of the same in a tilted position, as when pouring water from it; Figs. 4, 5, and 6, respectively, top, side, and front views of the improved kettle or boiler, when arranged with a removable cover.

Like letters designate corresponding parts in all of the figures.

The main feature of my invention consists in providing the boiler, kettle, or similar vessel with a cover or lid, so constructed and arranged in connection with the bail of the boiler or kettle that when the said bail is raised in lifting and holding suspended the boiler, it holds the lid nearly or quite shut, but so as to allow the water to drain out, without permitting the vegetables or food in the vessel to fall out; and when the boiler or kettle is resting on the stove or other support, and the bail down, the cover is free to be opened and closed, or removed, in the ordinary way; also, the bail is restricted in its movement, so that it does not swing beyond a vertical position, or thereabout, toward the rear side of the kettle, or that side which is to be raised in tilting, whereby the kettle can be tilted for draining and emptying with convenience, ease, and safety, and by using one hand only, if desired, and the burning of the hands thereby is avoided.

Let A in the drawings represent a culinary boiler or kettle, which may be made in any usual way, except that the lid B, as represented, is hinged to the ledge or fixed back *b*, partially covering the top of the vessel, or otherwise, in any manner, at one side of the journals *c c* of the bail C, so that it will extend under the bail when the latter is raised to a vertical position. This cover is of such a width that the bail will rise freely outside of its edges from its front part, till the said bail reaches a vertical or upright position, when it strikes shoulders or projections *d d*, and cannot be moved farther in that direction or toward the rear side of the kettle. There are also on that side of the boiler projections, notches, or shoulders *f f* just enough above the cover to allow the cover to move up a very little above the boiler or kettle, as shown in Fig. 3. The extent to which the cover is allowed to open is only sufficient to permit the water to drain off readily, and not allow the vegetables—like potatoes, peas, &c.—to escape.

In order to make its action still more perfect and certain, while allowing the water to drain off, a flange, *g*, of perforated sheet-tin or other metal, may be secured to the bottom of the lid, so as to shut inside of the vessel and cover the open space between it and the lid, when the latter is slightly raised by the bail in tilting the kettle. One shoulder or projection, *d*, would serve the purpose, but not so perfectly as one on each side of the kettle.

When the bail is down at the side of the vessel the cover may be raised and closed down without impediment.

Three important purposes are gained by this invention, besides that of allowing the water to drain off while retaining the articles within: First, the closed cover prevents the steam from scalding the hands in handling the boiler or kettle; second, the bail standing upright while the kettle in operation remains cool; third, the boiler can be tilted and emptied by simply leaning it against any support and merely holding the bail, and the burning and crocking of the hands are avoided. Also, there is or may be a notch or projection, *h*, at the front side of the kettle, as shown, or otherwise, to bear on the edge of any vessel, into which the water is to be drained and prevent the kettles slipping off.

Figs. 4, 5, and 6 show how the invention is applied when the cover or lid is not hinged to the boiler or kettles, but is removable therefrom. Here the lid B, which may be a simple disk of sheet metal, a little larger than the top of the vessel, so as not to sink down into the same, has two projecting wires or lugs, *d d*, on opposite edges thereof, the said projections or lugs forming supports, whereby the cover rests in notches *i i*, Fig. 5, in the sides of the kettle just behind the bail, and thus also furnishing guides to keep the cover in place. They also serve as the projections for the bail C to bear upon or swing over for holding the cover on while draining the vessel, as indicated in the same figure.

I prefer to turn the extremities *f f* of the bail-rod, which form the bail-loops or eyes outward, as represented in Figs. 4 and 5, so as to bear on the lugs or projections *d d*, thus rendering them easy of construction when the bail is made, and adding little or nothing to the cost thereof; but other constructions, arriving at the same results above described, may be used instead thereof.

The handle *h'* of the cover may be situated near the rear edge of the same, in order to indicate which way to tilt the kettle that the bail may hold the cover on.

The cover might be held in position on the kettle or boiler by other means than the projections *d d*, such as by an entering-flange on the under side, fitting in the kettle, in which case the ends or projections *f f* of the bail may turn inward, so as to bear on the edges of the cover and hold it in place; but I prefer the use of the projections *d d* and notches *i i*, especially as this construction does not interfere with the ordinary uses of the kettle.

This method of holding on an unhinged cover does not readily allow the water to drain off between its edge and the top of the kettle or boiler; but in such case there may be notches *l* in the upper edge of the kettle for that use, as indicated in Fig. 6, or there may be perforations *m* near one edge of the cover, as shown in Fig. 4.

What I claim as my invention, and desire to secure by Letters Patent, is—

1. The construction and arrangement of the cover and bail of a boiler, kettle, or other similar vessel with projections on each, substantially as described, whereby the bail, when raised and tilted, will hold the cover nearly or quite closed, leaving an open space or spaces sufficient to allow the water to drain off without spilling the contents of the vessel, substantially as and for the purpose herein specified.

2. In a kettle or boiler the combination of the bail C, with shoulders or projections *d d*, whereby the said bail may be sustained in an upright position while boiling goes on in the kettle, substantially as and for the purpose herein specified.

3. A kettle or boiler, provided with a notch or projection, *h*, on its front side, in combination with a cover, B, held upon the kettle or boiler by the bail, which is held in a perpendicular position, substantially as and for the purpose herein specified.

STEPHEN SPOOR.

Witnesses:
E. SMITH STRAIT,
E. M. GALLAHER.